US010146034B2

(12) United States Patent
Choi et al.

(10) Patent No.: US 10,146,034 B2
(45) Date of Patent: Dec. 4, 2018

(54) CATA-DIOPTRIC SYSTEM AND IMAGE CAPTURING DEVICE

(71) Applicant: Samsung Electronics Co., Ltd., Gyeonggi-do (KR)

(72) Inventors: Jong-chul Choi, Gyeonggi-do (KR); Kyong-tae Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/540,620

(22) PCT Filed: Dec. 7, 2015

(86) PCT No.: PCT/KR2015/013294
§ 371 (c)(1),
(2) Date: Jun. 29, 2017

(87) PCT Pub. No.: WO2016/117821
PCT Pub. Date: Jul. 28, 2016

(65) Prior Publication Data
US 2018/0024336 A1 Jan. 25, 2018

(30) Foreign Application Priority Data
Jan. 23, 2015 (KR) .................. 10-2015-0011302

(51) Int. Cl.
G02B 17/08 (2006.01)
G02B 27/00 (2006.01)
(Continued)

(52) U.S. Cl.
CPC ....... G02B 17/086 (2013.01); G02B 27/0018 (2013.01); G03B 17/00 (2013.01);
(Continued)

(58) Field of Classification Search
CPC ............ G02B 17/086; H04N 5/23212; H04N 5/23258; H04N 5/23287
See application file for complete search history.

(56) References Cited

U.S. PATENT DOCUMENTS 5,619,382 A    4/1997  Kato et al.
5,793,538 A    8/1998  Cameron et al.
(Continued)

FOREIGN PATENT DOCUMENTS

JP    09-222561 A    8/1997
JP    11-316343 A    11/1999
(Continued)

OTHER PUBLICATIONS

European Search Report dated Dec. 5, 2017.

Primary Examiner — Nelson D. Hernández Hernández
(74) Attorney, Agent, or Firm — Cha & Reiter, LLC

(57) ABSTRACT

Disclosed is a cata-dioptric system. A cata-dioptric system according to an embodiment of the present invention includes: a reflecting optical system that reflects incident light through a plurality of reflective surfaces; and a refracting optical system that refracts the reflected incident light, wherein the respective internal diameters of the plurality of reflective surfaces are disposed on the same perpendicular line as the external diameters of other reflective surfaces adjacent to the respective internal diameters of the plurality of reflective surfaces, or at a closer distance from a perpendicular line including the top surface of the refractive optical system.

14 Claims, 8 Drawing Sheets

(51) Int. Cl.
*H04N 5/232* (2006.01)
*G02B 17/00* (2006.01)
*G03B 17/00* (2006.01)

(52) U.S. Cl.
CPC ..... *H04N 5/23212* (2013.01); *H04N 5/23258* (2013.01); *H04N 5/23287* (2013.01)

(56) References Cited

U.S. PATENT DOCUMENTS

| | | | |
|---|---|---|---|
| 5,930,055 | A | 7/1999 | Eisenberg |
| 5,940,222 | A | 8/1999 | Sinclair et al. |
| 5,995,287 | A * | 11/1999 | Sekita ................ G02B 17/086 359/599 |
| 6,169,637 | B1 | 1/2001 | Tsunashima |
| 6,522,475 | B2 | 2/2003 | Akiyama et al. |
| 6,859,334 | B1 | 2/2005 | Kuiseko et al. |
| 7,898,749 | B2 | 3/2011 | Ford et al. |
| 8,391,705 | B2 | 3/2013 | Shabtay et al. |
| 2004/0150741 | A1 | 8/2004 | Togawa et al. |
| 2004/0150879 | A1 | 8/2004 | Araki et al. |
| 2005/0094540 | A1 * | 5/2005 | Konno ................ G11B 7/1387 369/112.23 |
| 2007/0040966 | A1 | 2/2007 | Teramoto et al. |
| 2010/0188856 | A1 * | 7/2010 | Ford ................ G02B 17/002 362/299 |
| 2012/0050891 | A1 | 3/2012 | Seidl et al. |
| 2013/0010180 | A1 | 1/2013 | Hatakeyama |
| 2013/0010376 | A1 * | 1/2013 | Hatakeyama ...... G02B 17/0804 359/731 |
| 2013/0134301 | A1 | 5/2013 | Takahashi |
| 2014/0267722 | A1 * | 9/2014 | Riot ...................... G02B 23/02 348/144 |

FOREIGN PATENT DOCUMENTS

| | | |
|---|---|---|
| JP | 2004-170638 A | 6/2004 |
| JP | 2007-52100 A | 3/2007 |
| KR | 10-2014-0014787 A | 2/2014 |
| KR | 10-2015-0084631 A | 7/2015 |

* cited by examiner

FIG. 3

|  | Surface type | Radius | Thickness | Glass |
|---|---|---|---|---|
| S0 | Sphere | 1.00E+18 | 1.00E+50 |  |
| S1 | Sphere | 1.00E+18 | 0 |  |
| S2 | Asphere | -1176.7372 | 5.55 | 491760.5746 |
| S3 | Asphere | -15.689308 | -3.888719 | 491760.5746 |
| S4 | Asphere | -12.955324 | 2.116093 | 491760.5746 |
| S5 | Asphere | -155.55806 | -3.626855 | 491760.5746 |
| S6 | Asphere | -18.121608 | 2.1200867 | 491760.5746 |
| S7 | Asphere | 6.8050434 | 1.0195871 |  |
| S8 | Asphere | -10.227996 | 0.53 | 534800.5571 |
| S9 | Asphere | -4.30007 | 0.1000469 |  |
| S10 | Asphere | -3.5874564 | 0.53 | 491760.5746 |
| S11 | Asphere | -3.9863666 | 0.8 |  |
| S12 | Asphere | 28.374035 | 0.523 | 651000.2149 |
| S13 | Asphere | 4.6115824 | 0.2 |  |
| S14 | Sphere | 1.00E+18 | 0.3000123 | BK7_SCHOTT |
| S15 | Sphere | 1.00E+18 | 0.0500053 |  |
| S16 | Sphere | 1.00E+18 | 0.2365908 |  |
| Image | Sphere | 1.00E+18 | 0 |  |

FIG. 5

| | Radius | K | A | B | C | D | E | F | G |
|---|---|---|---|---|---|---|---|---|---|
| S2 | -1176.74 | 0 | 7.65E-06 | -6.47E-08 | -1.42E-10 | 3.98E-12 | -6.11E-15 | -5.23E-17 | -1.78E-19 |
| S3 | -15.6893 | -2.86578 | -5.04E-05 | 2.27E-07 | -1.37E-09 | 1.44E-11 | -7.83E-14 | 1.84E-16 | 0 |
| S4 | -12.9553 | -1.19426 | 0.000129 | -4.80E-06 | 1.81E-07 | -3.53E-09 | 3.77E-11 | -1.68E-13 | 0 |
| S5 | -155.558 | 0 | -0.00077 | 2.09E-05 | -4.67E-07 | 8.22E-09 | -1.05E-10 | 9.72E-13 | -4.92E-15 |
| S6 | -18.1216 | 0 | -0.00273 | 3.45E-05 | 2.40E-06 | 4.16E-07 | -6.06E-08 | 3.26E-09 | -6.72E-11 |
| S7 | 6.805043 | 0 | -0.00656 | 0.00055 | -2.26E-06 | -1.05E-06 | 7.77E-08 | -2.72E-09 | -1.19E-13 |
| S8 | -10.228 | 0 | 0.001901 | 0.001058 | -7.42E-05 | 3.55E-06 | -7.66E-10 | 0 | 0 |
| S9 | -4.30007 | 0 | 0.007662 | 0.001401 | -0.0002 | 2.86E-05 | 2.39E-09 | 0 | 0 |
| S10 | 3.58746 | 0 | 0.00822 | 0.002921 | -0.00049 | 4.93E-05 | -4.71E-11 | -2.54E-21 | 0 |
| S11 | -3.98637 | 0 | 0.004357 | 0.003553 | -0.00054 | 2.97E-05 | 4.40E-10 | -3.68E-22 | 0 |
| S12 | 28.37404 | 0 | -0.03879 | 0.008399 | -0.0012 | 4.23E-05 | -1.24E-10 | -8.49E-22 | 0 |
| S13 | 4.611582 | 0 | -0.04145 | 0.00802 | -0.00093 | 3.88E-05 | 3.14E-09 | -2.77E-21 | 0 |

(A)

(B)

CATA-DIOPTRIC SYSTEM AND IMAGE CAPTURING DEVICE

CLAIM OF PRIORITY

This application is a National Phase Entry of PCT International Application No. PCT/KR2015/013294, which was filed on Dec. 7, 2015, and claims a priority to Korean Patent Application No. 10-2015-0011302, which was filed on Jan. 23, 2015, the contents of which are incorporated herein by reference.

TECHNICAL FIELD

The present invention relates to a cata-dioptric system and an image capturing device, and more particularly to a cata-dioptric system and an image capturing device, which can implement thin shaping of a lens with proper blocking of stray light.

BACKGROUND ART

Not only compact cameras and cameras for mobile devices but also mirrorless cameras and single-lens reflex cameras have a tendency to be gradually miniaturized. Accordingly, development of a thin type optical system for a small camera has been demanded. Recently, a cata-dioptric system has been developed, which implements thin shaping with performing of focusing utilizing both a reflective optical system and a refractive optical system.

A reflective lens is configured so that light is transferred through multiple reflections and the transferred light forms an image. However, it is necessary for such a reflective lens to have a configuration for blocking stray light if the stray light, other than a field of view, is incident. The stray light means an undesirable noise light that occurs due to a cause other than normal refraction or reflection.

Accordingly, there is a need for a cata-dioptric system that can implement thin shaping of an optical system with proper blocking of stray light.

DISCLOSURE

Technical Problem

The present invention has been made to address at least the above problems and/or disadvantages and to provide at least the advantages described below. Accordingly, an aspect of the present invention provides a cata-dioptric system that can implement thin shaping of an optical system with proper blocking of stray light and an image capturing device including such a cata-dioptric system.

Technical Solution

According to one aspect of the present invention, a cata-dioptric system includes a reflective optical system configured to reflect incident light through a plurality of reflective surfaces; and a refractive optical system configured to refract the reflected incident light, wherein internal diameters of the plurality of reflective surfaces are disposed on the same perpendicular line as that of external diameters of other reflective surfaces adjacent to the respective internal diameters of the plurality of reflective surfaces, or at a closer distance from a perpendicular line including a top surface of the refractive optical system.

The reflective optical system may be configured so that a surface that crosses an optical axis of the cata-dioptric system has a circular shape, and a surface that does not cross the optical axis of the cata-dioptric system has a ring shape around the optical axis.

The reflective optical system may be configured so that a surface from which the incident light is output is concavely formed in a direction of the top surface of the refractive optical system.

The reflective optical system may further include a connection surface configured to connect the plurality of reflective surfaces to each other.

The connection surface may be coated with a black material, or may be formed of a permeation surface that is permeated by the incident light.

The connection surface coated with the black material may have a refractive index that matches a refractive index of the cata-dioptric system.

The connection surface may have scattering characteristics for scattering the incident light if the incident light is incident to the connection surface.

The connection surface may include an antireflection coating that is permeated by the incident light if the incident light is incident to the connection surface.

The reflective optical system may further include a light absorption structure configured to absorb the incident light that has permeated the connection surface including the antireflection coating.

The reflective surface may be coated with a dielectric material and a reflective metal material.

The metal material may be any one of aluminum (Al), silver (Ag), and gold (Au).

According to another aspect of the present invention, an image capturing device includes a reflective optical system configured to reflect incident light through a plurality of reflective surfaces; a refractive optical system configured to refract the incident light that is reflected by the reflective optical system; an image sensor configured to sense the refracted incident light and to output an electrical signal; an image processor configured to process the output electrical signal; and a controller configured to perform focusing through movement of at least one of the reflective optical system and the refractive optical system, wherein internal diameters of the plurality of reflective surfaces are disposed on the same perpendicular line as that of external diameters of other reflective surfaces adjacent to the respective internal diameters of the plurality of reflective surfaces, or at a closer distance from a perpendicular line including a top surface of the refractive optical system.

The reflective optical system may be configured so that a surface that crosses an optical axis of the reflective optical system has a circular shape, and a surface that does not cross the optical axis of the reflective optical system has a ring shape around the optical axis.

The reflective optical system may be configured so that a surface from which the incident light is output is concavely formed in a direction of the top surface of the refractive optical system.

The reflective optical system may further include a connection surface configured to connect the plurality of reflective surfaces to each other.

The connection surface may be coated with a black material, or may be formed of a permeation surface that is permeated by the incident light.

The connection surface coated with the black material may have a refractive index that matches a refractive index of the cata-dioptric system.

The connection surface may have scattering characteristics for scattering the incident light if the incident light is incident to the connection surface.

The connection surface may include an antireflection coating that is permeated by the incident light if the incident light is incident to the connection surface.

The reflective optical system may further include a light absorption structure configured to absorb the incident light that has permeated the connection surface including the antireflection coating.

The reflective surface may be coated with a dielectric material and a reflective metal material.

The metal material may be any one of aluminum (Al), silver (Ag), and gold (Au).

The reflective surface may have a reflection rate of 96% or more.

Advantageous Effects

According to various embodiments of the present invention as described above, thin shaping of the optical system can be implemented with proper blocking of the stray light.

DESCRIPTION OF DRAWINGS

FIG. 3 is a table showing optical data of a refractive optical system according to an embodiment of the present invention;

FIG. 5 is a table showing aspheric surface coefficient values for aspheric surfaces of the cata-dioptric system of FIG. 2;

BEST MODE FOR INVENTION

Mode for Invention

Hereinafter, preferred embodiments of the present invention will be described in detail with reference to the accompanying drawings. In describing the embodiment of the present invention, a detailed description of known constructions or functions will be omitted if it is deemed that such description would make the gist of the present invention unnecessarily vague.

Figure 1:
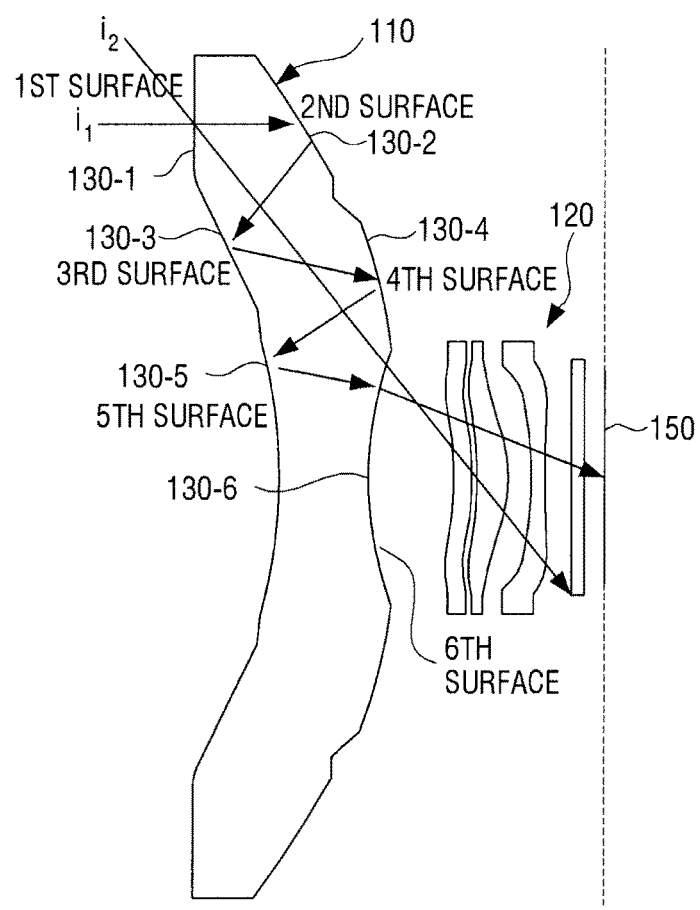
FIG. 1 is a view schematically illustrating the configuration of a cata-dioptric system according to an embodiment of the present invention.

FIG. 1 is a view schematically illustrating the configuration of a cata-dioptric system 100-1 according to an embodiment of the present invention.

Referring to FIG. 1, a cata-dioptric system 100-1 according to an embodiment of the present invention includes a reflective optical system 110 and a refractive optical system 120 that is disposed on the reflective optical system 110. Although not illustrated in the drawing, the reflective optical system 110 and the refractive optical system 120 may be fixedly accommodated in a barrel.

The reflective optical system 110 is a configuration that reflects incident light $i_1$ that is reflected from an object. For this, the reflective optical system 110 may include a plurality of reflective surfaces, that is, second to fifth surfaces 130-2, 130-3, 130-4, and 130-5, which can reflect the incident light $i_1$ that travels to the interior of the reflective optical system 110. The incident light $i_1$ that is reflected by the second to fifth surfaces 130-2, 130-3, 130-4, and 130-5, which are the plurality of reflective surfaces of the reflective optical system 110, travels to the refractive optical system 120.

The reflective optical system 110 includes a first surface 130-1 to which incident lights $i_1$ and $i_2$ are incident, and a sixth surface 130-6 that outputs the reflected light in a direction of a top surface 150 if the light that is incident to the first surface 130-1 is reflected. The first to fourth surfaces 130-1, 130-2, 130-3, and 130-4 are formed in a ring shape along the circumference of the reflective optical system 110, and the fifth and sixth surfaces 130-5 and 130-6 are arranged in a circular shape along a radius direction around an optical axis. That is, in the reflective optical system 110, a surface that crosses an optical axis of a cata-dioptric lens 100 may have a circular shape, and a surface that does not cross the optical axis of the cata-dioptric lens 100 may have a ring shape around the optical axis.

The plurality of reflective surfaces 130-2, 130-3, 130-4, and 130-5 of the reflective optical system 110 may be arranged to optically face each other so as to output the light that is incident through the first surface 130-1 to the sixth surface 130-6. Here, the arrangement of the reflective surfaces to optically face each other may not mean that the plurality of reflective surfaces 130-2, 130-3, 130-4, and 130-5 are arranged to physically face their front surfaces, but may mean that the reflective surfaces are arranged so that light that is reflected by any one reflective surface travels to another reflective surface. For example, the light $i_1$ that is incident to the first surface 130-1 is reflected to the third surface 130-3 by the second surface 130-2. Thereafter, the light $i_1$ is reflected by the third surface 130-3 and travels to the fourth surface 130-4. The light $i_1$ that is reflected by the fourth surface 130-4 is reflected again by the fifth surface 130-5, and travels toward the top surface 150 of the cata-dioptric system through the sixth surface 130-6. The first surface 130-1 and the sixth surface 130-6 are not reflective surfaces that reflect the light $i_1$, but are permeation surfaces. A high-reflection coating layer may be formed on the reflective surfaces 130-2, 130-3, 130-4, and 130-5. In contrast, a high-permeation coating layer may be formed on the permeation surfaces 130-1 and 130-6. The high-reflection coating layer and the high-permeation coating layer may reflect and may be permeated by the light having the same wavelength band (e.g., visible light).

The reflective surfaces 130-2, 130-3, 130-4, and 130-5 may be coated with a dielectric material and a reflective metal material. The metal material may be any one of aluminum (Al), silver (Ag), and gold (Au). In this case, the reflective surfaces 130-2, 130-3, 130-4, and 130-5 may have a reflection rate of 96% or more.

The refractive optical system is a constituent element for refracting the incident light. In particular, the refractive optical system 120 refracts the incident lights $i_1$ and $i_2$ that are output through the reflective optical system 110. The refractive optical system 120 may include a plurality of refractive lenses. The plurality of refractive lenses may have different refractive indexes in order to suppress chromatic aberration. The plurality of refractive lenses may refract the incident lights $i_1$ and $i_2$ that are output through the reflective optical system 110 to focus the output light on the top surface 150. An image sensor 121 (see FIGS. 7A and 7B) may be arranged on the top surface 150.

However, in such an embodiment, there may exist light $i_2$ that travels straight from the first surface 130-1 to the sixth surface 130-6. That is, the light passes straight without being reflected by the reflective surfaces in the reflective optical system 110 may become stray light to cause occurrence of noises such as ghosts and the like. In order to block the stray light, a long hood may be put in front of the lenses. However, in the case of a mobile device, it is unnatural to use such a hood, and there is a need for schemes that can block the light with no hood.

Figure 2:
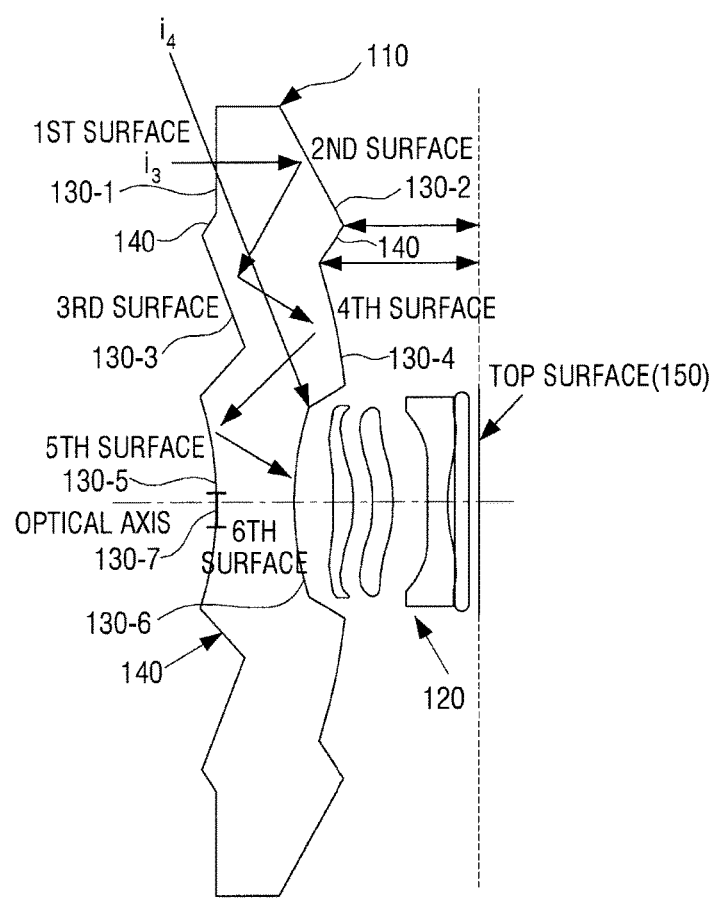
FIG. 2 is a view schematically illustrating the configuration of a cata-dioptric system according to another embodiment of the present invention.

FIG. 2 is a view schematically illustrating the configuration of a cata-dioptric system 100-2 according to another embodiment of the present invention.

Referring to FIG. 2, a cata-dioptric system according to another embodiment of the present invention includes a reflective optical system 110 and a refractive optical system 120 that is disposed on the reflective optical system 110. Although not illustrated in the drawing, the reflective optical system 110 and the refractive optical system 120 may be fixedly accommodated in a barrel.

The reflective optical system 110 is a configuration that reflects incident lights $i_3$ and $i_4$. For this, the reflective optical system 110 may include a plurality of reflective surfaces 130-2, 130-3, 130-4, and 130-5, which can reflect the incident lights $i_3$ and $i_4$ that travel to the interior of the reflective optical system 110. The incident light $i_3$ that is reflected by the plurality of reflective surfaces 130-2, 130-3, 130-4, and 130-5 of the reflective optical system 110 travels to the refractive optical system 120.

The reflective optical system 110 includes a first surface 130-1 to which incident lights $i_3$ and $i_4$ are incident, and a sixth surface 130-6 that outputs the reflected light in the direction of the top surface 150 if the light that is incident to the first surface 130-1 is reflected. The first to fourth surfaces 130-1, 130-2, 130-3, and 130-4 are formed in a ring shape along the circumference of the reflective optical system 110, and the fifth and sixth surfaces 130-5 and 130-6 are arranged in a circular shape along a radius direction around an optical axis. That is, in the reflective optical system 110, a surface that crosses the optical axis of a cata-dioptric lens 100 may have a circular shape, and a surface that does not cross the optical axis of the cata-dioptric lens 100 may have a ring shape around the optical axis.

The plurality of reflective surfaces 130-2, 130-3, 130-4, and 130-5 of the reflective optical system 110 may be arranged to optically face each other so as to output the light $i_3$ that is incident through the first surface 130-1 to the sixth surface 130-6. Here, the arrangement of the reflective surfaces to optically face each other may not mean that the plurality of reflective surfaces 130-2, 130-3, 130-4, and 130-5 are arranged to physically face their front surfaces, but may mean that the reflective surfaces are arranged so that light $i_3$ that is reflected by any one reflective surface travels to another reflective surface. For example, the light $i_3$ that is incident to the first surface 130-1 is reflected to the third surface 130-3 by the second surface 130-2. Thereafter, the light $i_3$ is reflected by the third surface 130-3 and travels to the fourth surface 130-4. The light that is reflected by the fourth surface 130-4 is reflected again by the fifth surface 130-5, and travels toward the top surface 150 through the sixth surface 130-6. The first surface 130-1 and the sixth surface 130-6 are not reflective surfaces that reflect the light, but are permeation surfaces. A high-reflection coating layer may be formed on the reflective surfaces 130-2, 130-3, 130-4, and 130-5. In contrast, a high-permeation coating layer may be formed on the permeation surfaces 130-1 and 130-6. The high-reflection coating layer and the high-permeation coating layer may reflect and may be permeated by the light having the same wavelength band (e.g., visible light).

FIG. 2 exemplarily illustrates four reflective surfaces 130-2, 130-3, 130-4, and 130-5. However, in this embodiment, the number of the reflective surfaces 130-2, 130-3, 130-4, and 130-5 is not limited to four, but at least two reflective surfaces may be used according to their designs.

The reflective optical system 110 of a cata-dioptric lens 100 may have a folded optics structure in which light traveling paths are multiply diffracted among the plurality of reflective surfaces 130-2, 130-3, 130-4, and 130-5. According to such a folded optics structure, an optical path is extended long using the plurality of reflective surfaces 130-2, 130-3, 130-4, and 130-5, and thus it is possible to greatly reduce the thickness (or length in an optical axis direction) of the reflective optical system 110 regardless of a focal distance of the reflective optical system 110. Accordingly, it is possible to produce a thin type camera.

The plurality of reflective surfaces 130-2, 130-3, 130-4, and 130-5 may be individually assembled and fixed in a camera barrel. In this case, its assembling process may be complicated, and it may take a lot of time to accurately locate the respective reflective surfaces 130-2, 130-3, 130-4, and 130-5. Accordingly, the plurality of reflective surfaces 130-2, 130-3, 130-4, and 130-5 may be formed by cutting or injecting one transparent material. The transparent material may be made of, for example, glass or a transparent plastic material, such as PMMA (Polymethylmethacrylate). Not only the reflective surfaces but also the permeable surfaces 130-1 and 130-6 may be formed by cutting or injecting the transparent material.

The refractive optical system 120 refracts the incident light $i_3$ that is reflected by the reflective optical system 110. The refractive optical system 120 may include a plurality of refractive lenses. The plurality of refractive lenses may have different refractive indexes in order to suppress chromatic aberration. The plurality of refractive lenses may refract the incident light $i_3$ that is reflected by the reflective optical system 110 to focus the refracted light on the top surface 150.

An image sensor 121 (see FIGS. 7A and 7B) may be arranged on the top surface 150. The image sensor 121 is configured to form an image of an object that has passed through the refractive lenses. The image sensor 121 includes a plurality of pixels that are arranged in the form of a matrix. Each of the plurality of pixels accumulates photo-charge in accordance with an incident light, and outputs an image that is caused by the photo-charge as an electrical signal. The image sensor 121 may be composed of a complementary metal oxide semiconductor (CMOS) or a charge coupled device (CCD). On a light incident surface of the image sensor 121, a cover layer (not illustrated) for protecting color filters (not illustrated) and the pixels of the image sensor 121 may be further arranged.

A predetermined area around the optical axis of the reflective optical system 110 is an area in which incident lights $i_3$ and $i_4$ are not reflected. In the above-described embodiment, the incident lights $i_3$ and $i_4$ do not reach this area, and thus this area is not in use. Unlike this, the above-described area may be configured to be permeated by light that reflected by an object and is incident thereto. In this case, one other refractive optical system may be further arranged at a front end of this area in the object direction.

Further, the light that is reflected or scattered from the unused area may act as a noise. Accordingly, the area may be black-painted or may be provided with a permeation surface, and a structure for blocking the permeating light may be provided in front of the lens to block the light that acts as the noise.

Internal diameters of circles around respective optical axes of the plurality of reflective surfaces 130-2, 130-3, 130-4, and 130-5 may be disposed on the same perpendicular line as that of external diameters of the circles on other reflective surfaces adjacent to the respective internal diameters of the plurality of reflective surfaces 130-2, 130-3, 130-4, and 130-5, or at a closer distance from a perpendicular line including the top surface 150 of the refractive optical system 100-2.

That is, referring to FIG. 2, it can be known that the internal diameter of the second surface 130-2 is disposed at a closer distance from the perpendicular line that includes the top surface 150 of the refractive optical system 100-2 than the external diameter of the fourth surface 130-4 that is adjacent to the internal diameter of the second surface 130-2. Similarly, the internal diameter of the first surface 130-1 is disposed at a closer distance from the perpendicular line that includes the top surface 150 of the refractive optical system 100-2 than the external diameter of the third surface 130-3 that is adjacent to the internal diameter of the first surface 130-1. Similarly, the internal diameter of the third surface 130-3 is disposed at a closer distance from the perpendicular line that includes the top surface 150 of the refractive optical system 100-2 than the external diameter of the fifth surface 130-5 that is adjacent to the internal diameter of the third surface 130-3. The internal diameter of the fourth surface 130-4 is disposed at a closer distance from the perpendicular line that includes the top surface 150 of the refractive optical system 100-2 than the external diameter of the sixth surface 130-6 that is adjacent to the internal diameter of the fourth surface 130-4. The first surface 130-1 and the sixth surface 130-6 are not reflective surfaces, but are permeation surfaces. That is, the above-described rule is concluded even between the reflective surface and the permeation surface.

According to the technical features of the present invention, the stray light, such as the incident light $i_4$, can be effectively blocked only by the structure of the reflective optical system 110. For example, it can be known that the incident light $i_4$ is blocked by a connection surface 140 between the fourth surface 130-4 and the sixth surface 130-6.

As described above, the reflective optical system 110 may further include the connection surface 140 for connecting the plurality of reflective surfaces 130-2, 130-3, 130-4, and 130-5 and the permeation surfaces 130-1 and 130-6 to one another. The connection surface 140 may be coated with a black material (e.g., black paint) to absorb a reflected light. However, if an incident angle is large, the total reflection effect may appear according to a Fresnel principle with respect to the light that is incident to the connection surface 140 with large incident angle, and it is necessary to maximally reduce this effect.

The black material may be a material having a refractive index that matches the refractive index of the reflective optical system 110. If the refractive indexes are different from each other, another reflection or total reflection may occur on the connection surface 140 to cause the stray light to be generated. Accordingly, the black material may have the refractive index that matches the refractive index of the reflective optical system 110. For this, a material that is index-matched to a lens material is spread on the lens material so that the black paint can be well adsorbed onto the lens material, and the black paint is coated thereon. Thereafter, through a drying or curing process, the lens and the black paint stick are well adhered to each other to achieve fine absorption without a loss of light. Further, through enlargement of the surface roughness of the connection surface 140 on which the black paint is spread, a part of the light that is incident to the connection surface 140 can be absorbed, and another part of the light can be diffused to the front surface.

Further, the connection surface 140 may include an anti-reflection coating that is permeated by the incident light if the incident light is incident to the connection surface. In this case, the cata-dioptric system 100-1 may further include a light absorption structure configured to absorb the incident light that has permeated the connection surface 140.

As described above, the connection surface 140 may be composed of an absorption surface. The connection surface 140 may have scattering characteristics for scattering the incident light if the incident light is incident to the connection surface 140. For this, a fine scattering structure may be formed on the connection surface 140.

On the other hand, in the reflective optical system 110, the surface (sixth surface) that outputs the incident light may be concavely formed in the direction of the top surface 150 of the cata-dioptric system 100. In other words, the surface (sixth surface) that outputs the incident light may be convexly formed in the direction of the object of the cata-dioptric system 100. Through the above-described shape, a space in which the refractive optical system 120 is arranged may be secured to implement thin shaping of the cata-dioptric system 100, and a barrel for accommodating the cata-dioptric system 100 may be made with a low height to heighten productivity.

Figure 4:
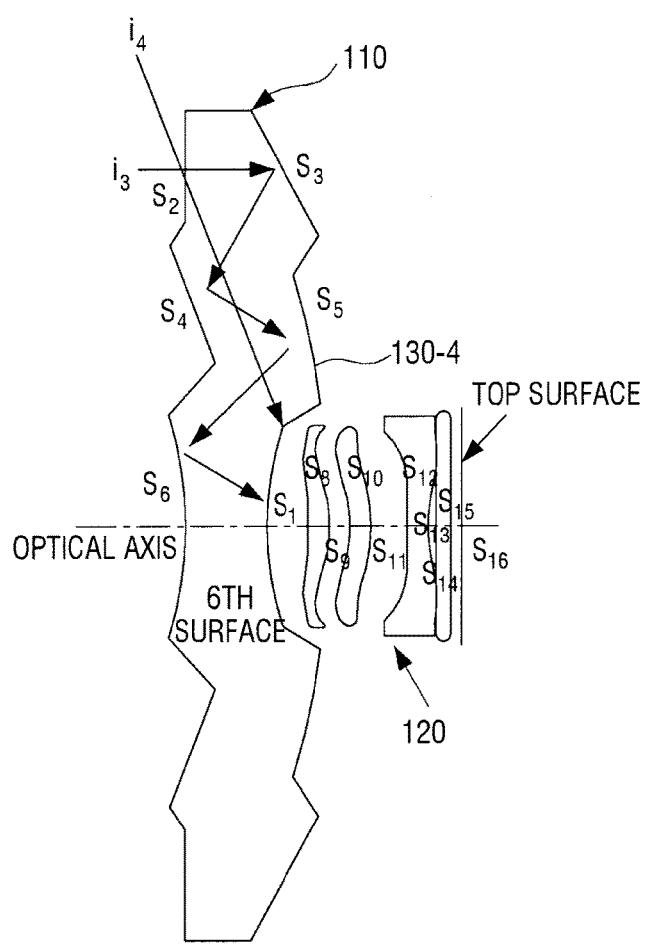
FIG. 4 is a view illustrating each surface of the refractive optical system of FIG. 2.

FIG. 3 is a table showing optical data of a refractive optical system according to an embodiment of the present invention, and FIG. 4 is a view illustrating each surface of the refractive optical system of FIG. 2.

In a table of FIG. 3, surfaces S0 and S1 indicate virtual spherical surfaces. The surface S0 indicates an object. The center thickness differs depending on the distance from the object. Referring to FIG. 4, S2 indicates the first surface 130-1, S3 indicates the second surface 130-2, and S4 indicates the third surface 130-3. Further, S5 indicates the fourth surface 130-4, S6 indicates the fifth surface 130-5, and S7 indicates the sixth surface 130-6. Further, S8 to S13 indicate surfaces of refractive lenses of the refractive optical system 120. That is, S8 and S9 indicate the front surface and the rear surface of the first refractive lens, and S10 and S11 indicate the front surface and the rear surface of the second refractive lens. Further, S12 and S13 indicate the front surface and the rear surface of the third refractive lens, and S14 and S15 indicate the front surface and the rear surface of a plate (cover glass) of an image sensor. Further, S16 indicates an empty space, and "Image" indicates an image sensor surface. Further, in the surface type, "Sphere" indicates a spherical surface, and "Asphere" indicates an aspheric surface. Further, "Radius" indicates a curvature radius, "Thickness" indicates a center thickness, and "Glass" indicates material characteristics.

On the other hand, the surfaces S2 to S13 indicate aspheric surfaces. FIG. 5 is a table showing aspheric surface coefficient values for aspheric surfaces of the cata-dioptric system of FIG. 2. Here, the aspheric surface coefficients may follow Mathematical Expression 1 below.

Mathematical Expression 1

$$Z(r) = \frac{cr^2}{1 + \sqrt{1-(1+k)c^2r^2}} + Ar^4 + Br^6 + Cr^8 + Dr^{10} + Er^{12} + Gr^{16} + Hr^{18} + Jr^{20} \quad \text{[Equation 1]}$$

In an embodiment, an effective focal length (EFL) of a cata-dioptric system 100-2 is 26.3 mm, an entrance pupil diameter (EPD) is 22 mm, and an F-number is 1.195.

Figure 6:
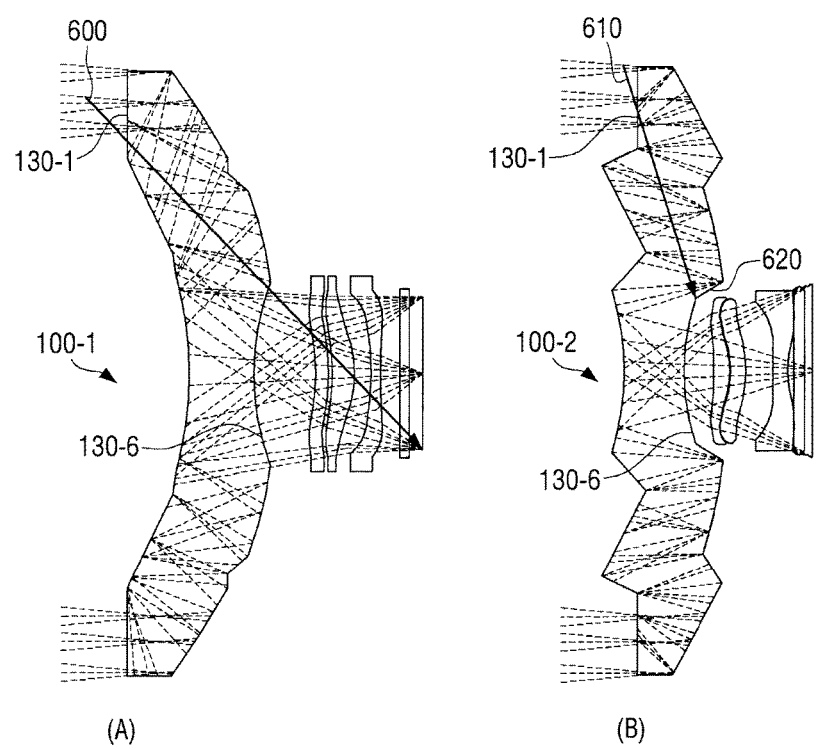
FIGS. 6A and 6B are views comparably illustrating paths of incident light of cata-dioptric systems according to the present invention.

FIGS. 6A and 6B are views comparably illustrating paths of incident light of cata-dioptric systems 100-1 and 100-2 according to the present invention.

FIG. 6A illustrates an incident light path of a cata-dioptric system 100-1 according to an embodiment of the present invention, and FIG. 6B illustrates an incident light path of a cata-dioptric system 100-2 according to another embodiment of the present invention.

As illustrated in FIG. 6A, in the cata-dioptric system 100-1, it can be known that incident light 600 that travels straight from the first surface 130-1 to the sixth surface 130-6 is stray light that is not reflected by the reflective surface, but directly passes through the cata-dioptric system 100-1.

In contrast, as illustrated in FIG. 6B, in the cata-dioptric system 100-2, incident light 610 that travels straight from the first surface 130-1 to the sixth surface 130-6 is reflected by the reflective surface 620, and thus stray light can be effectively blocked.

Figure 7:
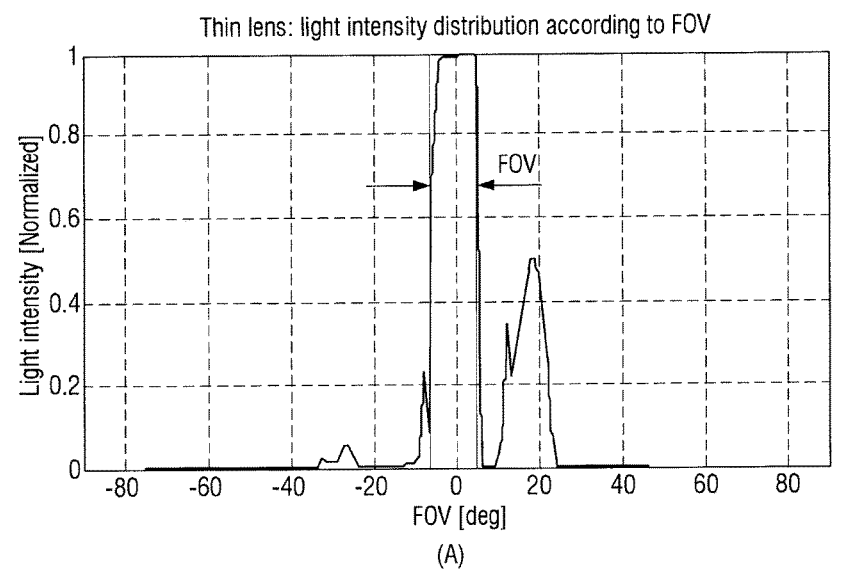
FIGS. 7A and 7B are diagrams illustrating the results of simulations on whether light other than a field of view reaches an image sensor in cata-dioptric systems according to the present invention.
Figure 7:
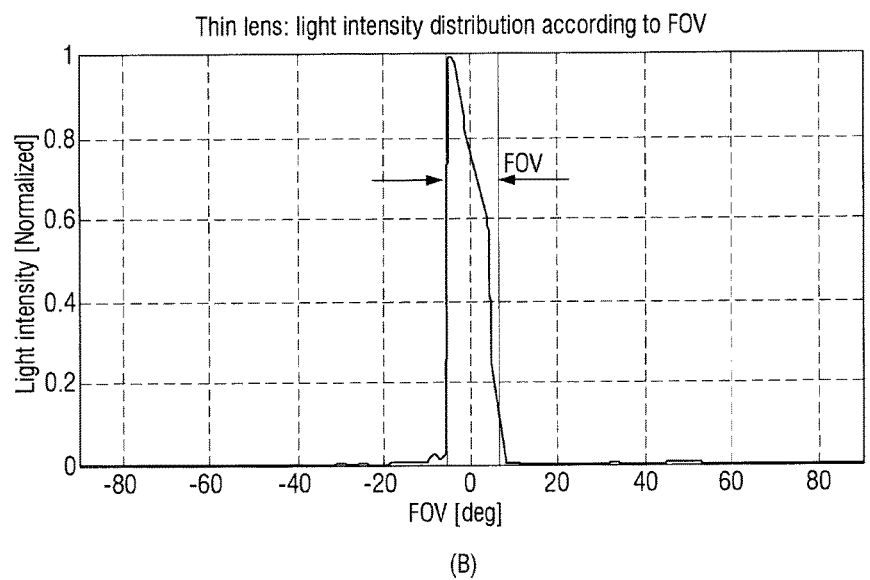

FIGS. 7A and 7B are diagrams illustrating the results of simulations on whether light other than a field of view reaches an image sensor in cata-dioptric systems 100-1 and 100-2 according to the present invention.

FIG. 7A illustrates the result of the simulation on whether light other than a field of view reaches an image sensor in a cata-dioptric system 100-1 according to an embodiment of the present invention, and FIG. 7B illustrates the result of the simulation on whether light other than a field of view reaches an image sensor in a cata-dioptric system 100-2 according to another embodiment of the present invention.

As illustrated in FIG. 7A, in the cata-dioptric system 100-1, it can be known that the light other than the field of view (FOV) reaches the image sensor. In contrast, as illustrated in FIG. 7B, in the cata-dioptric system 100-2, it can be known that the light other than the field of view (FOV) does not reach the image sensor, but is blocked.

Figure 8:
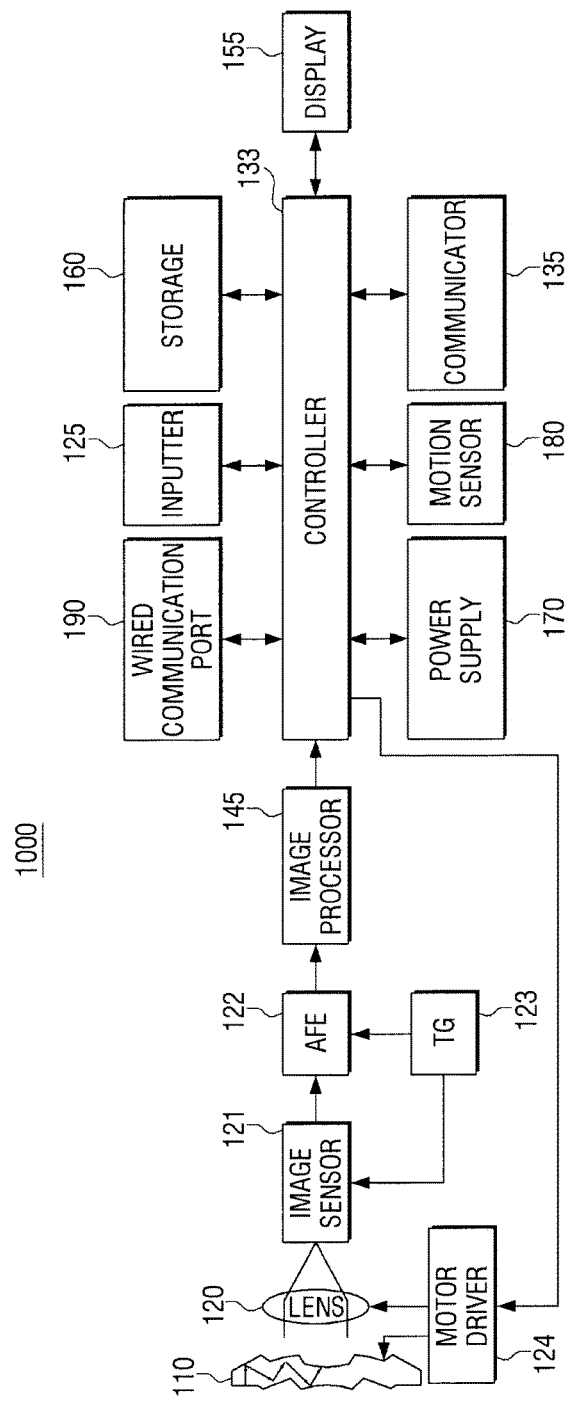
FIG. 8 is a block diagram illustrating the configuration of an image capturing device according to an embodiment of the present invention.

Hereinafter, an image capturing device 100 that includes the above-described cata-dioptric systems 100-1 and 100-2 will be described. FIG. 8 is a block diagram illustrating the configuration of an image capturing device 1000 according to an embodiment of the present invention.

An image capturing device 1000 according to an embodiment of the present invention may be one of various electronic devices. For example, the image capturing device 1000 may be implemented by, for example, one of various devices, such as a digital camera, an MP3 player, a PMP, a smart phone, a cellular phone, smart glasses, a tablet PC, an a smart watch.

Referring to FIG. 8, an image capturing device 1000 according to an embodiment of the present invention includes a reflective optical system 110, a refractive optical system 120, an image sensor 121, an AFE 122, a TG 123, a motor driver 124, an image processor 145, a controller 133, a display 155, a power supply 170, a storage 160, and an inputter 125.

Since the reflective optical system 110 and the refractive optical system 120 have been described above, duplicate explanation thereof will be omitted.

Although not illustrated in the drawing, the image capturing device 1000 may further include an iris. The iris is configured to adjust the quantity of light that is incident to the inside of the image capturing device 1000 after passing through the reflective optical system 110 and the refractive optical system 120. The iris has a mechanical structure that can gradually increase or decrease the size of an opening so as to control the quantity of the incident light. The iris indicates the degree of opening with an iris number that is called an F-number. As the iris value becomes smaller, the size of the opening becomes larger, and thus the quantity of the incident light is increased to generate a bright image.

The image sensor 121 is configured to form an object image that has passed through the refractive optical system 120. The image sensor 121 includes a plurality of pixels that are arranged in the form of a matrix. Each of the plurality of pixels accumulates photo-charge in accordance with the incident light, and outputs an image that is caused by the photo-charge as an electrical signal. The image sensor 121 may be composed of a complementary metal oxide semi-conductor (CMOS) or a charge coupled device (CCD).

The image sensor 121 may include a photodiode PD, a transmission transistor TX, a reset transistor RX, and a floating diffusion node FD. The photodiode PD generates and accumulates photo-charge that corresponds to an optical image of an object. The transmission transistor TX transmits the photo-charge that is generated in the photodiode PD to the floating diffusion node FD in response to a transmission signal. The reset transistor discharges the charge that is stored in the floating diffusion node FD in response to a reset signal. The charge that is stored in the floating diffusion node FD is output before the reset signal is applied, and a CDS image sensor performs a correlated double sampling (CDS) process. Further, an ADC converts an analog signal of which the CDS process has been performed into a digital signal.

The timing generator (TG) 123 outputs a timing signal for reading out pixel data of the image sensor 121. The TG 123 is controlled by the controller 133.

The analog front end (AFE) 122 digitalizes the electrical signal of the object image that is output from the image sensor 121 through sampling thereof. The AFE 113 is controlled by the controller 133.

However, as described above, another configuration that can replace the AFE 122 and the TG 123 may be designed. In particular, in the case where the image sensor 121 is implemented by a CMOS type, such a configuration may be unnecessary.

The motor driver 124 performs focusing through driving of a focusing lens based on information that is calculated by reading out phase difference pixels. However, in the case where the image capturing device 1000 is implemented by a smart phone or a cellular phone, the focusing can be performed by software without driving a lens for focusing, and thus the motor driver 124 may not be provided. Further, the motor driver 124 may correct hand shaking by driving at least one of a plurality of lenses and image sensors 121 that are included in the reflective optical system 110 and the refractive optical system 120 in a direction that is perpendicular to the optical axis of the cata-dioptric system 100 or in the optical axis direction. This will be described in more detail later.

The image processor 145 processes raw image data under the control of the controller 133, and records the processed data in the storage 160. Further, the image processor 145 transfers the processed image data that is stored in the storage 160 to the display 155.

In the case of performing auto focusing using a phase difference, the image processor 145 separates a signal for generating an image (signal that is read out from a general pixel) and a signal for calculating the phase difference (signal that is read out from the phase difference pixel) from a signal that is output from the image sensor 121 and is sampled by the AFE 123. This is to quickly calculate the phase difference using the signal for calculating the phase difference and to quickly perform auto focusing through generation of an image, such as a live view, in parallel.

However, the image capturing device 1000 according to various embodiments of the present invention is not limited to the auto focusing technology using the phase difference pixel. That is, the image capturing device 1000 according to various embodiments of the present invention may further include a technical configuration that can perform contrast auto focusing.

The image processor 145 processes the raw image data to produce YCbCr data. First, pixel defects of the raw image data are corrected by a correction circuit (not illustrated). The correction circuit corrects the pixel defects with reference to a correction table, and addresses of the defective pixels are registered in the correction table. Correction is performed with respect to the pixels that coincide with the addresses through neighboring pixels.

The image processor 145 includes an OB clamp circuit (not illustrated) that determines a black level of an image. A solid-state imaging device 121 is located in an optical black (OB) area, and detects a signal average value of the OB area and determines the black level through a difference between the respective pixel values.

Further, the image processor 145 controls sensitivity rates that are different by colors using a sensitivity-rate control circuit (not illustrated). The sensitivity-rate control circuit controls the sensitivities of R, G, and B colors under a standard light source. Typically, the gain value of G is fixed to "1", and the sensitivities of R and B are matched to this.

In the case of outputting a still image, the image data is output through an output buffer after the control of the sensitivity rate. In this case, since the image is generated in an interlaced manner, it is not possible to perform post-processing immediately. In contrast, in the case of outputting a live-view image, the image is generated in a progressive manner, and thus it is possible to perform post-processing immediately.

Further, the image processor 145 performs skip readout in a manner that it reads out partial pixel lines and skips the remaining pixel lines using a horizontal skip readout circuit (not illustrated), and thus the number of pixels of the raw image is reduced.

The image processor 145 controls white balance (WB) of the image data using a WB control circuit (not illustrated). Spectrum distribution of an illumination light differs in accordance with an imaging environment, and a white object may not be displayed white even through the imaging thereof. Different gain values are given to R, G, and B pixels to match their signal levels. Typically, the gain value of G is fixed to "1", and the signal levels of R and B are matched to this.

Further, the image processor 145 performs gamma correction with respect to the image data. Through the gamma correction, grayscale conversion to match the output of the display 155 is performed.

Further, the image processor 145 generates a typical color image signal that is composed of three colors for one pixel from a bayer signal of one color for one pixel using a color interpolation circuit (not illustrated).

Further, the image processor 145 performs color space conversion and color correction to match the output using a color conversion/color correction circuit (not illustrated). A lookup table (LUT) may be used if needed. After the color conversion/color correction, the image data becomes YCbCr data.

The image processor 145 converts resolution using a resolution conversion circuit (not illustrated) to match an image size.

The image processor 145 processes a space filter for image data using a space filter circuit (not illustrated). An edge of a Y signal is emphasized, and low-pass-filtering (LPF) of Cb/Cr signal is performed.

Further, the image processor 145 converts the Cb/Cr signal into image data of YCbCr 4:2:2 through performing of skip readout with respect to the Cb/Cr signal using a CbCr skip readout circuit (not illustrated). The image data is output through an output buffer, and is recorded in the storage 160 through a bus.

In the case of the still image, an interlace type readout may be performed, and in this case, an adjacent pixel line does not exist, and thus it is not possible to directly process color interpolation. Accordingly, after completion of the preprocessing, the still image is first stored in the storage 160 in a progressive type through the output buffer by controlling the order of pixel lines. The image data is read again and is input to the image processor 145 through an input buffer.

However, in the case of the still image, an embodiment of the present invention is not limited to the interlace type, but may be implemented to read out the still image in the progressive type.

On the other hand, in the case of the still image, it is necessary to generate a preview image that is a small-sized image to be seen after the imaging operation or a thumbnail image. This is prepared through omission of data of some pixels like the skip readout.

The image processor 145 interpolates the phase-difference pixel portion into general pixel values using an AF signal interpolation circuit (not illustrated). The phase-difference pixel is located between general pixels, and if the portion is used as it is, resolution deterioration may occur. Accordingly, the interpolation is performed using the surrounding general pixels.

A JPEG codec of the image processor 145 compresses YCbCr data. The compressed image data is recorded in the storage 160. Through this, the image generation procedure is completed.

A motion sensor 180 is configured to sense a motion of the image capturing device 1000. For this, the motion sensor 180 may include at least one of an acceleration sensor, an angular velocity sensor, and a geomagnetic sensor.

The acceleration sensor senses a variation of a speed for a unit time. The acceleration sensor may be implemented in three axes. In the case of implementation as a 3-axis acceleration sensor, the acceleration sensors are arranged in different directions to provide X, Y, and Z-axis acceleration sensors that are orthogonal to one another.

The acceleration sensor converts output values of the X, Y, and Z-axis acceleration sensors into digital values and provides the converted digital values to a preprocessor. In this case, the preprocessor may include a chopping circuit, an amplification circuit, a filter, and an A/D converter. Accordingly, the electrical signals that are output from the 3-axis acceleration sensor are chopped, amplified, and filtered, and then are converted into digital voltage values.

The angular velocity sensor is configured to sense an angular velocity through sensing of a variation of a pointing device 100 for a unit time in a predetermined direction. As the angular velocity sensor, a gyroscope having three axes may be used.

It is also possible to implement a 6-axis gyroscope further using a geomagnetic sensor or the like. The geomagnetic sensor is a sensor that can detect an azimuth angle through detection of a magnetic field flow. The geomagnetic sensor detects azimuth coordinates of the image capturing device 1000, and detects a direction in which the image capturing device 1000 is put on the basis of the azimuth coordinates.

The geomagnetic sensor detects the geomagnetic field through measurement of a voltage value that is induced by the geomagnetic field using a flux-gate or the like. The geomagnetic sensor may be implemented in 2-axis or 3-axis type. In this case, since the output values of the geomagnetic field that are calculated by the respective axis geomagnetic sensors differ depending on the size of the neighboring magnetic field, it is general to perform normalization for mapping the geomagnetic field output values in a predetermined range (e.g., −1 to 1). The normalization is performed using a normalization factor, such as a scale value or an offset value. In order to calculate the normalization factor, it is necessary to first calculate the output values of the geomagnetic sensor as rotating the geomagnetic sensor several times, and then to detect a maximum value and a minimum value among the output values. The value that is normalized using the normalization factor is used for an azimuth angle correction work.

The controller 133 may include a processor, a ROM 112 for storing therein a control program for controlling the image capturing device 1000, and a RAM 113 that is used to store signals or data input from an outside of the image capturing device 1000 or as a storage area for various works that are performed in the image capturing device 1000.

The controller 133 controls the whole operation of the image capturing device 1000 and a signal flow between internal constituent elements of the image capturing device 1000, and performs data processing. The controller 133 provides a power supply from the power supply 170 to the internal constituent elements. If a user's input or a set condition is satisfied, the controller 133 may execute the operating system (OS) and various applications stored in the storage 160.

The processor may include a graphic processing unit (GPU) for graphic processing. In the processor, a core (not illustrated) and a GUP (not illustrated) may be implemented in system on chip (SoC). The processor may include a single core, dual cores, triple cores, quad cores, and their multiple cores. Further, the processor, the ROM, and the RAM may be connected to one another through an internal bus.

In particular, the controller 133 may control the motor driver 124 to perform focusing through movement of at least one of refractive lenses of the reflective optical system, the refractive optical system, and the image sensor 121 based on the sensing result of the motion sensor 180.

In the case of the reflective optical system 110, since the focal distance is long, the reflective optical system 110 may be sensitive to hand shaking. In order to compensate for the hand shaking, at least one of a plurality of refractive lenses included in the reflective optical system 110, the image sensor 121, and the refractive optical system 120 may be driven in a direction that is vertical to the optical axis or in a direction that is horizontal to the optical axis. For example, any one or the whole of the plurality of refractive lenses may be driven in a direction in which the hand shaking is offset, for example, in the direction that is vertical to the optical axis.

Further, if the location of an object is changed (i.e., if the distance between an object and the image capturing device is changed), at least one of the plurality of refractive lenses that are included in the reflective optical system 110, the image sensor 121, and the refractive optical system 120 may be driven in the direction that is vertical or horizontal to the optical axis in order to adjust the focal point.

In addition, the controller 133 may control the operations of all configurations of the image capturing device 1000.

The display 155 is configured to display at least one of a user interface that is composed of texts and icons, an object, image capturing device information, a dynamic image, and a still image.

Here, there is no limit in kind of an object. That is, the object may be at least one of an application icon, a content icon, a thumbnail image, a folder icon, a widget, a list item, a menu, and a content image. The application icon is an icon for executing an application that is included in the image capturing device 1000 if a corresponding image is selected. The content icon is an icon for reproducing content if a corresponding image is selected. The thumbnail image is an image that is reduced to a small size to be seen at a glance, and the folder icon is an icon for displaying a file in a folder if a corresponding image is selected. The widget is an icon for providing a user interface for immediately executing an application icon without menu selection in several stages. The list item is configured to display a file in the form of a list, and the menu image is configured to display a selectable menu. In particular, the display 155 provides a user interface to be described later.

The display 155 may be designed through various display panels. That is, the display 155 may be implemented by various display technologies, such as an organic light emitting diodes (OLED), a liquid crystal display (LCD) panel, a plasma display panel (PDP), a vacuum fluorescent display (VFD), a field emission display (FED), and an electroluminescence display (ELD). The display panel is mainly of a light emission type, but does not exclude a reflection type display (E-ink, P-ink, or photonic crystal). Further, the display may be implemented by a flexible display or a transparent display.

The inputter 125 is configured to receive a user input. The inputter 125 may include at least one button (not illustrated). Further, the inputter 125 may include a touch screen that is located on the display 155.

The at least one button may be formed on a front, side, or rear surface of a housing of the image capturing device 1000 as a push type or a touch type, and may include at least one of a power/lock button, a shutter button, a menu button, a home button, a back button, and a search button. If the button is pressed, a corresponding control command is generated to be transferred to the controller 133, and the controller 133 controls the operation of the image capturing device 1000 in accordance with the corresponding control command.

The storage 160 stores therein various pieces of information. Specifically, the storage 160 stores therein the operating system, the processed raw image data excluding applications, the converted YCbCr 4:2:2 image data, and the compressed YCbCr image data.

The storage 160 may include a memory, such as a ROM or a RAM, a hard disk drive (HDD), and a blu-ray disc (BD). The memory may be an electrically erasable and programmable ROM (EEPROM) or a nonvolatile memory, such as a nonvolatile RAM, but the use of a volatile memory, such as a static RAM or a dynamic RAM, is not excluded. In the case of the hard disk drive, a small hard disk which has a size of 1.8 inches or less and which is mountable on the image capturing device 1000 may be applied.

The communicator 135 may include at least one of a mobile communication module and a sub communication module.

Under the control of the controller 133, the mobile communication module (not illustrated) may be wirelessly connected to an external device using one or two or more antennas. The mobile communication module transmits/receives wireless signals for voice call, video call, short message service (SMS), multimedia message (MMS), and data communication with a portable phone (not illustrated) having a phone number that can be connected to the image capturing device 1000, a smart phone (not illustrated), a tablet PC, or another image capturing device (not illustrated).

The sub communication module (not illustrated) may include at least one of a wireless LAN module (not illustrated) and a short-range communication module (not illustrated). For example, the sub communication module may include any one of the wireless LAN module (not illustrated) and the short-range communication module (not illustrated), or may include both the wireless LAN module (not illustrated) and the short-range communication module (not illustrated).

Under the control of the controller 133, the short-range communication module may perform wireless short-range communication between the image capturing device 1000 and an external device without an access point (AP). The short-range communication module may include Bluetooth, Bluetooth low energy, infrared data association (IrDA), Wi-Fi, ultra wideband (UWB), and near field communication (NFC).

A wired communication port 190 is configured to support USB, high definition multimedia interface (HDMI), digital video/visual interface), and mobile high-definition link (MHL), and to transmit/receive data with an external device that is connected thereto by a wire cable.

In addition, the image capturing device 1000 may further include a multimedia unit (not illustrated), a GPS (not illustrated), and a proximity sensor (not illustrated).

In the description of the present invention, the term "controller" includes a processor, a ROM, and a RAM.

While the invention has been shown and described with reference to certain embodiments thereof, it will be understood by those skilled in the art that various changes in form and detail may be made therein without departing from the spirit and scope of the present invention, as defined by the appended claims.

The invention claimed is:

1. A cata-dioptric system comprising:
a reflective optical system configured to reflect incident light through a plurality of reflective surfaces; and
a refractive optical system configured to refract the reflected incident light, wherein:
the reflective optical system includes a first reflective surface arranged at a first angle with respect to an optical axis of the cata-dioptric system and a second reflective surface arranged at a second angle with respect to the optical axis, the first and second angles being different such that a connection surface arranged at a third angle with respect to the optical axis connects the first and second reflective surfaces, and
an incident light outside a field of view of the cata-dioptric system is blocked by the connection surface.

2. The cata-dioptric system as claimed in claim 1, wherein the reflective optical system further comprises a permeation surface that crosses the optical axis, wherein the permeation surface has a circular shape, and the first or second reflective surface has a ring shape around the optical axis.

3. The cata-dioptric system as claimed in claim 1, wherein the reflective optical system further comprises a permeation surface that is concavely formed in a direction of a top surface of the refractive optical system.

4. The cata-dioptric system as claimed in claim 1, wherein the connection surface is coated with a black material.

5. The cata-dioptric system as claimed in claim 4, wherein the connection surface coated with the black material has a refractive index that matches a refractive index of the cata-dioptric system.

6. The cata-dioptric system as claimed in claim 1, wherein the connection surface has scattering characteristics for scattering the incident light if the incident light is incident to the connection surface.

7. The cata-dioptric system as claimed in claim 1, wherein the connection surface comprises an antireflection coating that is permeated by the incident light if the incident light is incident to the connection surface.

8. The cata-dioptric system as claimed in claim 7, wherein the reflective optical system further comprises a light absorption structure configured to absorb the incident light that has permeated the connection surface including the antireflection coating.

9. The cata-dioptric system as claimed in claim 1, wherein the first or second reflective surface is coated with a dielectric material and a reflective metal material.

10. The cata-dioptric system as claimed in claim 9, wherein the metal material is any one of aluminum (Al), silver (Ag), and gold (Au).

11. An image capturing device comprising:
a reflective optical system configured to reflect incident light through a plurality of reflective surfaces;
a refractive optical system configured to refract the incident light that is reflected by the reflective optical system;
an image sensor configured to sense the refracted incident light and to output an electrical signal;
an image processor configured to process the output electrical signal; and
a controller configured to perform focusing through movement of at least one of the reflective optical system and the refractive optical system,
wherein:
the reflective optical system includes a first reflective surface arranged at a first angle with respect to an optical axis of the image capturing device and a second reflective surface arranged at a second angle with respect to the optical axis, the first and second angles being different such that a connection surface arranged at a third angle with respect to the optical axis connects the first and second reflective surfaces, and an incident light outside a field of view of the image capturing device is blocked by the connection surface.

12. The image capturing device as claimed in claim 11, further comprising a motion sensor configured to sense a motion of the image capturing device, wherein the controller moves at least one of the reflective optical system, the refractive optical system, and the image sensor based on the sensed motion of the image capturing device to prevent a noise from occurring due to shaking of the image capturing device.

13. The image capturing device as claimed in claim 11, wherein the reflective optical system further comprises a permeation surface that crosses the optical axis of the reflective optical system, wherein the permeation surface has a circular shape, and the first or second reflective surface has a ring shape around the optical axis.

14. The image capturing device as claimed in claim 11, wherein the reflective optical system further comprises a permeation surface that is concavely formed in a direction of a top surface of the refractive optical system.

* * * * *